United States Patent
Park

(10) Patent No.: US 9,468,074 B2
(45) Date of Patent: Oct. 11, 2016

(54) VEHICLE LIGHTING CONTROL SYSTEM USING WEARABLE GLASSES AND METHOD FOR THE SAME

(71) Applicant: HYUNDAI MOTOR COMPANY, Seoul (KR)

(72) Inventor: Sung Woo Park, Seoul (KR)

(73) Assignee: HYUNDAI MOTOR COMPANY, Seoul (KR)

( * ) Notice: Subject to any disclaimer, the term of this patent is extended or adjusted under 35 U.S.C. 154(b) by 0 days.

(21) Appl. No.: 14/834,167

(22) Filed: Aug. 24, 2015

(65) Prior Publication Data

US 2016/0174335 A1 Jun. 16, 2016

(30) Foreign Application Priority Data

Dec. 16, 2014 (KR) .................. 10-2014-0180998

(51) Int. Cl.
  *H05B 37/02* (2006.01)
  *B60J 3/04* (2006.01)
  *B60Q 3/02* (2006.01)

(52) U.S. Cl.
  CPC ............ *H05B 37/0227* (2013.01); *B60J 3/04* (2013.01); *B60Q 3/0293* (2013.01); *H05B 37/0218* (2013.01); *H05B 37/0272* (2013.01)

(58) Field of Classification Search
  CPC .......... H05B 37/0227; H05B 37/0218; H05B 37/0272; B60J 3/04; B60Q 3/0293
  USPC .............................................. 315/77
  See application file for complete search history.

(56) References Cited

U.S. PATENT DOCUMENTS

| 2013/0222642 | A1* | 8/2013 | Watanabe | H04N 5/23219 348/234 |
| 2014/0098008 | A1* | 4/2014 | Hatton | G06T 11/00 345/8 |
| 2015/0062469 | A1* | 3/2015 | Fleury | B60J 3/04 349/14 |
| 2016/0174335 | A1* | 6/2016 | Park | H05B 37/0227 315/77 |

FOREIGN PATENT DOCUMENTS

| JP | 9-315210 A | 12/1997 |
| JP | 2008-170785 A | 7/2008 |
| JP | 2011-93413 A | 5/2011 |
| KR | 10-2009-0095695 A | 9/2009 |

* cited by examiner

*Primary Examiner* — Dylan White
(74) *Attorney, Agent, or Firm* — McDermott Will & Emery LLP

(57) ABSTRACT

A vehicle lighting control system includes wearable glasses configured to recognize pupils of a driver in a vehicle in real time, a head unit configured to receive a size of the pupils of the driver from the wearable glasses to acquire brightness control values of a plurality of lighting devices installed in the vehicle according to a predetermined formula, and a controller configured to adjust brightness of the lighting devices installed in the vehicle according to the brightness control values received from the head unit.

20 Claims, 2 Drawing Sheets

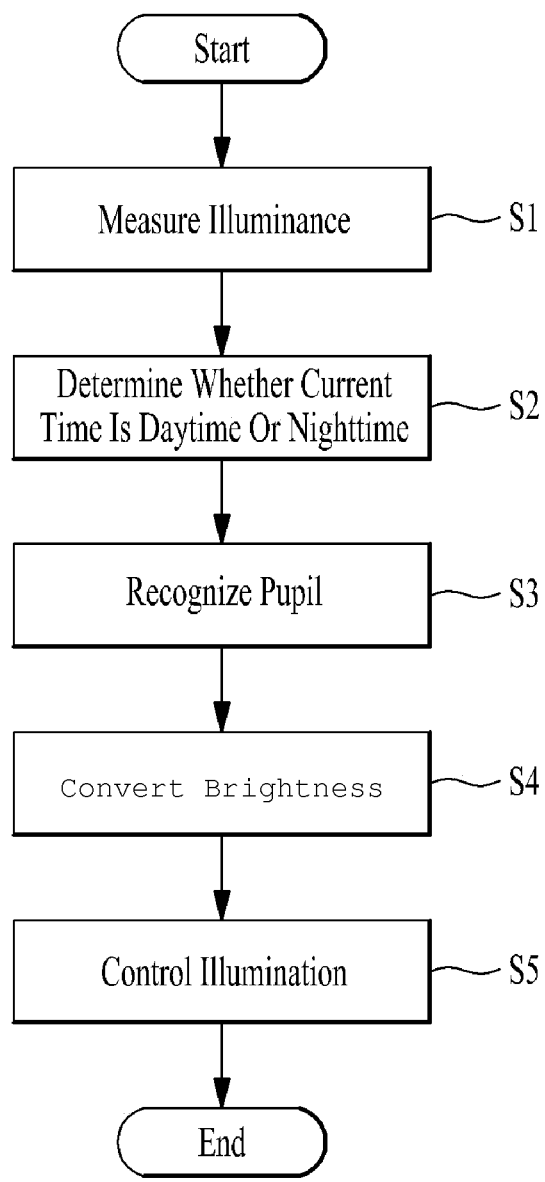

VEHICLE LIGHTING CONTROL SYSTEM USING WEARABLE GLASSES AND METHOD FOR THE SAME

CROSS REFERENCE TO RELATED APPLICATION

This application claims the benefit of Korean Patent Application No. 10-2014-0180998, filed on Dec. 16, 2014 with Korean Intellectual Property Office, the disclosure of which is hereby incorporated by reference as if fully set forth herein.

BACKGROUND OF THE INVENTION

1. Field of the Invention

The present invention relates to a vehicle lighting control system using wearable glasses and a method for the same, and more particularly, to a vehicle lighting control system using wearable glasses providing an optimized in-vehicle environment for a driver by automatically adjusting lamp brightness in the vehicle according to day and night, and a method for the same.

2. Discussion of the Related Art

In general, traveling of a vehicle may be affected by the mood of the driver. If the driver is in a good mood, driving may be smoothly performed. Otherwise, the driver may drive the vehicle recklessly by, for example, violating the speed limit. Accordingly, safe driving at high speed may be ensured if the mood of the driver of the vehicle is properly controlled for driving. One method for the driver to change his mood may be listening to music through an audio/video system installed in the vehicle.

The lamps installed in conventional vehicles include headlights, fog lights, backup lights, dome lights, gauge lamps, turn indicators, taillights, and running lights.

Such conventional lamps are operated in a manner that light having a certain intensity is turned on when the driver manipulates the switches or opens the door.

When these lights are controlled together with the audio/video system equipped in the vehicle during driving to control the driver's mood, safer and more pleasant driving are expected.

As the lights described are manually controlled by the driver, there is a problem of deterioration in usability of such lights.

CITED REFERENCE

Patent Document

Korean Patent Application Publication No. 10-2009-0024364 (Mar. 9, 2009)

SUMMARY OF THE INVENTION

Accordingly, the present invention is directed to a vehicle lighting control system using wearable glasses and a method for the same.

An object of the present invention is to provide drivers with an optimum in-vehicle environment by automatically adjusting brightness of lights in the vehicle through wearable glasses based on standards set by the drivers during driving.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these objects and other advantages and in accordance with the purpose of the invention, as embodied and broadly described herein, a vehicle lighting control system includes wearable glasses configured to recognize pupils of a driver in a vehicle in real time, a head unit configured to receive a size of the pupils of the driver from the wearable glasses to acquire brightness control values of a plurality of lighting devices installed in the vehicle according to a predetermined formula, and a controller configured to adjust brightness of the lighting devices installed in the vehicle according to the brightness control values received from the head unit.

The vehicle lighting control system may further include an illumination measurement sensor configured to scan a light intensity of an exterior environment of the vehicle and measure the light intensity at predetermined time intervals in real time to acquire a measured illuminance.

The vehicle lighting control system may further include a monitoring module configured to determine whether an exterior of the vehicle is at a daytime or a nighttime.

The monitoring module may include a determiner configured to determine whether a current time is daytime or nighttime by comparing the measured illuminance for the light intensity acquired from the illumination measurement sensor with preset values corresponding to the daytime and the nighttime.

The monitoring module may include a selector configured to selectively transmit the daytime or nighttime to the controller according to the daytime or nighttime determined by the determiner.

The wearable glasses may be connected to the head unit through Wi-Fi or Bluetooth to transmit data of the size of the pupils acquired from the driver in real time to the head unit.

The wearable glasses may include a sensor unit configured to determine whether or not the wearable glasses are worn by the driver.

The sensor unit may include at least one selected from the group consisting of a pressure sensor configured to determine whether or not the wearable glasses are worn by the driver through a pressure of a nose of the driver against a nose supporter of the wearable glasses, a body temperature sensor configured to measure a temperature of parts of the driver's face contacting temples of the wearable glasses to determine whether or not the wearable glasses are worn by the driver, and an iris recognition sensor configured to recognize eyeballs of the driver to determine whether or not the wearable glasses are worn by the driver.

The wearable glasses include a recognizer provided with a camera module for photographing eyeballs of the driver, the recognizer acquiring the size of the pupils photographed by the camera module in real time.

The recognizer may collect image files for different sizes of the pupils in a range from a contracted pupil diameter to an expanded pupil diameter.

The head unit may include a converter configured to receive an image file of the pupils of the driver acquired from the wearable glasses and select a pupil image file from among pre-stored pupil image files to compare pupil images in the received image file and the selected pupil image file and measure a similarity therebetween.

The converter may change predetermined brightness values of the lighting devices or a predetermined transmissivity value according to the size of the pupils of the driver and transmit the changed brightness values or transmissivity value to the controller.

The controller may control brightness of each of the lighting devices by updating brightness values of the lighting devices based on a measured similarity value with respect to the size of the pupils of the driver.

The controller may control transmissivity of a front window of the vehicle in real time according to a transmissivity value acquired from a converter.

The controller may control the brightness of each of the lighting devices and adjusts the transmissivity of the front window by comparing a reference daytime or a reference nighttime according to the size of the pupils of the driver acquired from the converter with a reference daytime or a reference nighttime acquired from a selector.

In another aspect of the present invention, a vehicle lighting control method using wearable glasses includes measuring illumination of a daytime and a nighttime by acquiring an illuminance of an exterior of a vehicle, and determining whether a current time is the daytime or the nighttime based on the illuminance acquired through the measuring, recognizing pupils of a driver in the vehicle and determining whether the driver is dazzled based on lighting devices installed in the vehicle, and converting data about a light intensity of an exterior environment of the vehicle acquired through the determining or a size of the pupils of the driver acquired through the recognizing into a brightness value, and controlling brightness of the lighting devices installed in the vehicle according to the brightness value obtained through the converting.

The recognizing may include photographing eyeballs of the driver through the wearable glasses and acquiring the size of the pupils in real time.

The recognizing may include collecting image files for different sizes of the pupils in a range from a contracted pupil diameter to an expanded pupil diameter.

The converting may include storing an image file of the pupils of the driver acquired through the wearable glasses in a head unit and comparing the same with a pupil image file selected from among pre-stored pupil image files to measure a similarity between pupil images in the image file and the selected pupil image file.

The controlling may include controlling the brightness of each of the lighting devices based on the light intensity of the exterior environment of the vehicle and adjusting transmissivity of a front window to protect eyes of the driver from dazzling light.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings:

FIG. 2 is a flowchart illustrating a method for controlling vehicle lighting using wearable glasses according to one embodiment of the present invention.

DETAILED DESCRIPTION OF THE INVENTION

Figure 1:
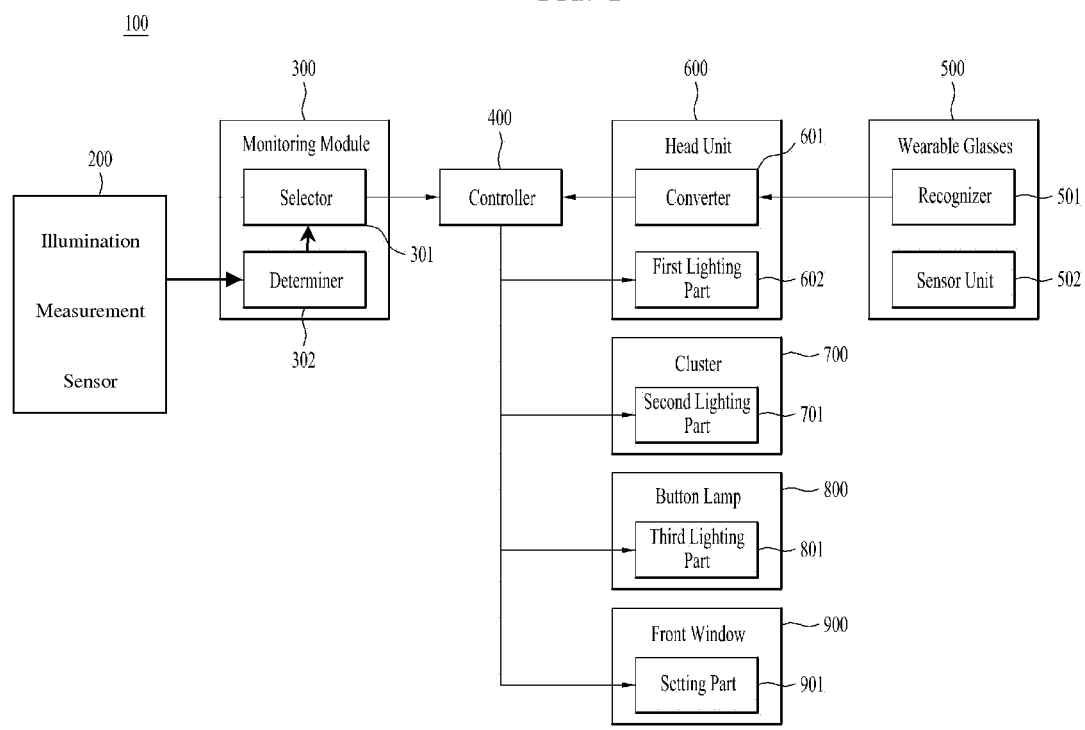
FIG. 1 is a block diagram illustrating a vehicle lighting control system using wearable glasses according to one embodiment of the present invention.

Reference will now be made in detail to the preferred embodiments of the present invention, examples of which are illustrated in the accompanying drawings. Wherever possible, the same reference numbers will be used throughout the drawings to refer to the same or like parts. In describing the present invention, a detailed description of well-known functions and constituents will be omitted if it is determined that such description can unnecessarily obscure the main points of the present invention. It will be appreciated that, for simplicity and clarity of illustration, the dimensions of some of the elements are exaggerated, omitted, or schematically shown relative to other elements. In addition, elements shown in the drawings have not necessarily been drawn to scale.

FIG. 1 is a block diagram illustrating a vehicle lighting control system using wearable glasses according to one embodiment of the present invention, FIG. 2 is a flowchart illustrating a method for controlling vehicle lighting using wearable glasses according to one embodiment of the present invention.

As shown in FIG. 1, a vehicle lighting control system 100 using the wearable glasses includes an illumination measurement sensor 200, a monitoring module 300, a controller 400, wearable glasses 500, and a head unit 600.

In addition, the lighting devices controlled through the wearable glasses 500 includes a first lighting part 602 of the head unit 600, a second lighting part 701 of a cluster 700, a third lighting part 801 of a button lamp 800, and a setting part 901 of a front window 900.

The illumination measurement sensor 200 is a device for measuring illuminance of the exterior of a vehicle to determine whether it is daytime or nighttime. This sensor does not allow electrical current to flow therethrough, like an insulator, when the sensor is in a shady place which has no visible light, and allows electrical current to flow therethrough when exposed to visible light. The sensor has high internal resistance in the shade and has low internal resistance in light. The sensor includes a variable resistor that is configured to change the internal resistance thereof according to brightness of external illumination to operate a circuit connected thereto.

Accordingly, when the vehicle passes through a shady place such as a tunnel during driving, the illumination measurement sensor 200 may determine that it is nighttime and adjust brightness of lighting devices such as the first lighting part 602, the second lighting part 701, and the third lighting part 801 which are installed in the vehicle.

In addition, the illumination measurement sensor 200 scans intensity of light in the environment outside the vehicle, measures the intensity of light in real time at predetermined time intervals, and transmits measured illuminance to the monitoring module 300.

In this regard, a determiner 302 is provided in the monitoring module 300 to receive data containing the measured illuminance from the illumination measurement sensor 200.

Accordingly, the determiner 302 determines whether it is daytime or nighttime by comparing the data containing the measured illuminance acquired from the illumination measurement sensor 200 with predetermined illuminance for the daytime and nighttime, and transmits the data about the determined daytime or nighttime to a selector 301.

The selector 301 may transmit, to the controller 400, data for selectively controlling and setting the first lighting part 602, the second lighting part 701 and the third lighting part 801, which are installed inside the vehicle, to one of the modes of ON, OFF and AUTO depending on whether the exterior environment of the vehicle corresponds to daytime or nighttime, such that the controller 400 controls the first lighting part 602, the second lighting part 701, and the third lighting part 801.

Further, the controller 400 may control transmissivity of the front window 900 based on the data about the illuminance of the exterior environment of the vehicle through the setting part 901 of the front window 900 for blocking external light.

Subsequently, after the first lighting part 602, the second lighting part 701 and the third lighting part 801 which are controlled by the controller 400 are operated for more than a predetermined time, an image file of the pupil size of the driver may be checked through the wearable glasses 500 to control dome lights of the vehicle.

The wearable glasses 500 are worn by a driver of a vehicle and provided with a sensor unit 502 for checking whether or not the wearable glasses 500 are worn. The sensor unit 502 includes one of a pressure sensor configured to determine whether or not the wearable glasses 500 are worn based on, for example, pressure of the driver's nose against a nose supporter of the wearable glasses 500, a body temperature sensor configured to measure the temperature of the parts of the driver's face that contact the temples of the wearable glasses 500 to determine whether or not the wearable glasses 500 are worn by the driver, and an iris recognition sensor configured to recognize eyeballs of the driver to determine whether or not the wearable glasses 500 are worn.

Accordingly, the sensor unit 502 may inform the driver of the vehicle of a message indicating whether or not the wearable glasses 500 are worn, by displaying the message on the head unit 600 or making sounds.

The wearable glasses 500 includes a recognizer 501 which is provided with a camera module for photographing eyeballs of the driver and is configured to acquire the size of the photographed pupils of the driver from the camera module in real time.

The recognizer 501 adjusts brightness of light in consideration of the pupil of the driver photographed in real time and an iris region, which varies with the pupils, in order to enhance accuracy of pupil recognition. Thereby, multiple pupil images according to pupil sizes are captured from the time at which the pupil size is maximized or approximately maximized to the time at which the pupil size is minimized or approximately minimized by using the recognizer 501.

In addition, the recognizer 501 reflects, in pupil recognition, a physiological phenomenon of change in the iris region according to expansion of the driver's pupil in sensitive response to light during nighttime driving and contraction of the driver's pupil during daytime driving, in order to reduce the possibility of the driver momentarily failing to keep eyes forward due to dazzling light, which may lead to traffic accidents, while the vehicle is traveling or moving from a shady area such as a tunnel to a sunny area.

Thereby, the recognizer 501 transmits the images of the pupils of the driver and corresponding pupil size information to the head unit 600.

The head unit 600 receives a file of the images of the driver's pupils acquired from the wearable glasses 500, and transmits the same to a converter 601 to control the lighting devices installed in the vehicle by comparing the pupil size of the driver with a pre-stored pupil size.

The converter 601 selects, from among multiple pupil images with different pupil sizes pre-stored in the head unit 600, a pupil image having a pupil size most similar to that of a pupil image of the driver acquired from the wearable glasses 500 in real time, and determines similarity between the pupil images. Then, the converter 601 converts the determined pupil size into predetermined brightness values of the first lighting part 602, the second lighting part 701 and the third lighting part 801 or the predetermined transmissivity value of the setting part 901 and transmits the values to the controller 400. For example, the head unit 600 or the converter 601 contains a database includes a plurality of pupil sizes and a plurality of sets of brightness values and transmissivity values that may be used to control brightness of the first lighting part 602, the second lighting part 701 and the third lighting part 801, and transmissivity of the setting part 901. Since each of the plurality of pupil sizes of the data base corresponds only to one set of brightness values and transmissivity value, if a pupil size is determined, a corresponding set of brightness values and transmissivity value is determined and selected by the converter 601 from the database.

The controller 400 controls the first lighting part 602, the second lighting part 701 and the third lighting part 801, or the setting part 901 by comparing the data for determining daytime or nighttime acquired from the monitoring module 300 with the brightness values or the transmissivity value acquired from the head unit 600 to control brightness of the first lighting part 602, the second lighting part 701 and the third lighting part 801 or transmissivity in the setting part 901. This may lessen eyestrain caused to the driver during driving, making the driver feel more comfortable in driving or helping to cope with drowsy driving.

In addition, the controller 400 may control the first lighting part 602, the second lighting part 701, the third lighting part 801, or the setting part 901 independently.

Hereinafter, a detailed description will be given of a vehicle lighting control method according to the vehicle lighting control system 100 using the wearable glasses configured as above.

As shown in FIG. 2, the method involves an illumination measurement sensor 200 configured to measure light intensity of the exterior environment of a vehicle, a monitoring module 300 configured to determine whether it is daytime or nighttime based on the illuminance measured by the illumination measurement sensor 200, wearable glasses 500 configured to acquire the size of a pupil of the driver according to the amount of externally delivered light in real time by photographing an eyeball of the driver during driving, a head unit 600 configured to receive a pupil image file of the driver acquired through the wearable glasses 500, and compare the same with a pre-stored pupil image to analyze the pupil image file and convert the same into brightness of the lighting devices in the vehicle or transmissivity, and a controller 400 configured to control the lighting devices according to the illuminance, brightness or transmissivity acquired from the monitoring module 300 and the head unit 600.

The method includes an illumination measurement step (S1) of measuring illumination for the daytime and nighttime by acquiring illuminance of the exterior of the vehicle (S1), a determination step (S2) of determining whether it is daytime or nighttime based on the illuminance acquired in the illumination measurement step (S1), a pupil recognition step (S3) of recognizing the pupils of the driver of the vehicle to determine whether light from the lighting devices in the vehicle is dazzling to the driver, a brightness conversion step (S4) of converting data of the light intensity of the exterior of the vehicle or the pupil size of the driver acquired in the determination step (S2) or the pupil recognition step (S3) into brightness (S4), and a lighting control step (S5) of controlling brightness of the lighting devices installed in the vehicle according to the brightness obtained through conversion in the brightness conversion step (S4).

In the illumination measurement step (S1), light intensity of the exterior environment of the vehicle is scanned to measure the light intensity at predetermined time intervals in real time.

In the determination step (S2), the data of illuminance measured by the illumination measurement sensor 200 is transmitted to the determiner 302, such that the data of illuminance acquired from the illumination measurement sensor 200 is compared with the predetermined illuminance values for the daytime and nighttime to determine whether it is daytime or nighttime.

In the pupil recognition step (S3), brightness of light is adjusted in consideration of the pupil of the driver photographed in real time by the recognizer 501 provided with a camera module for photographing eyeballs of the driver and an iris region, which varies according to the photographed pupil, in order to enhance accuracy of pupil recognition. Thereby, multiple pupil images according to pupil size are captured from the time at which the pupil size is maximized or approximately maximized to the time at which the pupil size is minimized or approximately minimized.

In the brightness conversion step (S4), a pupil image file of the driver acquired from the recognizer 501 in real time is transmitted to the converter 601. Thereby, the image file is analyzed by the converter 601 by being compared with the pre-stored pupil images to convert the pupil size information corresponding to the real-time pupil image of the driver into predetermined brightness for lighting control.

In the lighting control step (S5), the lighting devices installed in the vehicle are controlled to preset brightness according to the brightness acquired from the converter 601. This may lessen driver eyestrain during daytime or nighttime driving, making the driver feel more comfortable in driving or helping to cope with drowsy driving.

As apparent from the above description, a vehicle lighting control system using wearable glasses and a method for the same according to the present invention has effects as follows.

First, a new value may be created by maximizing the emotional quality for the driver during driving.

Second, as the illumination is automatically adjusted, an in-vehicle environment proper for individual drivers may be provided.

Third, as brightnesses of lights installed in the vehicle are automatically adjusted according to change in exterior or interior brightness of the vehicle, convenience may be enhanced.

Fourth, the body condition of the driver may be handled by correspondingly changing the standard brightness of lights.

It will be apparent to those skilled in the art that various modifications and variations can be made in the present invention without departing from the spirit or scope of the inventions. Thus, it is intended that the present invention covers the modifications and variations of this invention provided they come within the scope of the appended claims and their equivalents.

What is claimed is:

1. A vehicle lighting control system, comprising:
   wearable glasses recognizing pupils of a driver in a vehicle in real time;
   a head unit receiving a size of the pupils of the driver from the wearable glasses and acquiring brightness control values of a plurality of lighting devices installed in the vehicle according to a predetermined formula; and
   a controller adjusting brightness of the plurality of lighting devices according to the brightness control values received from the head unit.

2. The vehicle lighting control system according to claim 1, further comprising an illumination measurement sensor measuring a light intensity of an exterior environment of the vehicle at predetermined time intervals in real time to acquire a measured illuminance.

3. The vehicle lighting control system according to claim 2, further comprising a monitoring module determining whether an exterior of the vehicle is at a daytime or a nighttime.

4. The vehicle lighting control system according to claim 3, wherein the monitoring module comprises a determiner determining whether a current time is daytime or nighttime by comparing the measured illuminance with preset values corresponding to the daytime and the nighttime.

5. The vehicle lighting control system according to claim 4, wherein the monitoring module comprises a selector selectively transmitting the daytime or nighttime to the controller according to the daytime or nighttime determined by the determiner.

6. The vehicle lighting control system according to claim 1, wherein the wearable glasses are connected to the head unit through Wi-Fi or Bluetooth to transmit data of the size of the pupils acquired from the driver in real time to the head unit.

7. The vehicle lighting control system according to claim 6, wherein the wearable glasses comprise a sensor unit determining whether or not the wearable glasses are worn by the driver.

8. The vehicle lighting control system according to claim 7, wherein the sensor unit is at least one selected from the group consisting of:
   a pressure sensor determining whether or not the wearable glasses are worn by the driver through a pressure of a nose of the driver against a nose supporter of the wearable glasses;
   a body temperature sensor measuring a temperature of parts of the driver's face contacting temples of the wearable glasses to determine whether or not the wearable glasses are worn by the driver; and
   an iris recognition sensor recognizing eyeballs of the driver to determine whether or not the wearable glasses are worn by the driver.

9. The vehicle lighting control system according to claim 6, wherein the wearable glasses comprise a recognizer provided with a camera module for photographing eyeballs of the driver, the recognizer acquiring the size of the pupils photographed by the camera module in real time.

10. The vehicle lighting control system according to claim 9, wherein the recognizer collects image files for different sizes of the pupils in a range from a contracted pupil diameter to an expanded pupil diameter.

11. The vehicle lighting control system according to claim 1, wherein the head unit comprises a converter receiving an image file of the pupils of the driver acquired from the wearable glasses, and selecting a pupil image file from among pre-stored pupil image files to compare pupil images in the received image file and the selected pupil image file and measure a similarity therebetween.

12. The vehicle lighting control system according to claim 11, wherein the converter changes predetermined brightness values of the lighting devices or a predetermined transmissivity value according to the size of the pupils of the driver and transmits the changed brightness values or transmissivity value to the controller.

13. The vehicle lighting control system according to claim 1, wherein the controller controls brightness of each of the lighting devices by updating brightness values of the lighting devices based on a measured similarity value with respect to the size of the pupils of the driver.

14. The vehicle lighting control system according to claim 13, wherein the controller controls transmissivity of a front window of the vehicle in real time according to a transmissivity value acquired from a converter.

15. The vehicle lighting control system according to claim 13, wherein the controller controls the brightness of each of the lighting devices and adjusts the transmissivity of the front window by comparing a reference daytime or a reference nighttime according to the size of the pupils of the driver acquired from the converter with a reference daytime or a reference nighttime acquired from a selector.

16. A vehicle lighting control method using wearable glasses, comprising steps of:
measuring illumination of a daytime and a nighttime by acquiring an illuminance of an exterior of a vehicle;
determining whether a current time is the daytime or the nighttime based on the illuminance acquired through the measuring;
recognizing pupils of a driver in the vehicle and determining whether the driver is dazzled based on lighting devices installed in the vehicle;
converting data about a light intensity of an exterior environment of the vehicle acquired through the determining or a size of the pupils of the driver acquired through the recognizing into a brightness value; and
controlling brightness of the lighting devices installed in the vehicle according to the brightness value obtained through the converting.

17. The vehicle lighting control method according to claim 16, wherein the step of recognizing comprises photographing eyeballs of the driver through the wearable glasses and acquiring the size of the pupils in real time.

18. The vehicle lighting control method according to claim 17, wherein the step of recognizing further comprises collecting image files for different sizes of the pupils in a range from a contracted pupil diameter to an expanded pupil diameter.

19. The vehicle lighting control method according to claim 16, wherein the step of converting comprises storing an image file of the pupils of the driver acquired through the wearable glasses in a head unit and comparing the same with a pupil image file selected from among pre-stored pupil image files to measure a similarity between pupil images in the image file and the selected pupil image file.

20. The vehicle lighting control method according to claim 16, wherein the step of controlling comprises controlling the brightness of each of the lighting devices based on the light intensity of the exterior environment of the vehicle and adjusting transmissivity of a front window to protect eyes of the driver from dazzling light.

* * * * *